(12) United States Patent
Senoh

(10) Patent No.: US 7,212,727 B2
(45) Date of Patent: May 1, 2007

(54) TRICK PLAY METHOD FOR DIGITAL STORAGE MEDIUM

(75) Inventor: Takanori Senoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1234 days.

(21) Appl. No.: 09/926,762

(22) PCT Filed: Apr. 11, 2001

(86) PCT No.: PCT/JP01/03115

§ 371 (c)(1),
(2), (4) Date: Mar. 18, 2002

(87) PCT Pub. No.: WO01/82607

PCT Pub. Date: Nov. 1, 2001

(65) Prior Publication Data

US 2003/0007780 A1    Jan. 9, 2003

(30) Foreign Application Priority Data

Apr. 21, 2000    (JP) ............................ 2000-120752

(51) Int. Cl.
*H04N 5/91* (2006.01)
(52) U.S. Cl. .............................. 386/68; 386/69; 386/70
(58) Field of Classification Search ................ 386/68, 386/69, 70, 109, 111, 112, 125
See application file for complete search history.

(56) References Cited

U.S. PATENT DOCUMENTS 5,630,005 A    5/1997    Ort
5,715,176 A *  2/1998    Mobini ................. 709/236
6,002,834 A    12/1999   Hirabayashi et al.
6,006,004 A *  12/1999   Moriyama et al. ........... 386/46

(Continued)

FOREIGN PATENT DOCUMENTS

EP    0644692    3/1995

(Continued)

OTHER PUBLICATIONS

English Language Abstract of JP 11-155130.

(Continued)

*Primary Examiner*—Thai Q. Tran
*Assistant Examiner*—Hung Dang
(74) *Attorney, Agent, or Firm*—Greenblum & Bernstein, P.L.C.

(57) ABSTRACT

When trick play modes are implemented using a lookup table cross-referencing content divided into sectors of specific size with content encoding unit information, an accurate playback start time code cannot be detected because the total content playback time is not clear. A trick play method for digital storage media used to record and reproduce multimedia content resolves this problem and enables random access playback, fast-forward play, fast-reverse play and other trick play modes from any desired position in the content by recording program content segmented into media object units, each recorded as a separate file; recording a program manager file containing a media object information table; recording a media object information file containing playback time information and entry points at a specific time interval for each media object, and recording a playlist manager file containing a table of user-specified playback start program IDs and playback start time and end time information.

12 Claims, 22 Drawing Sheets

U.S. PATENT DOCUMENTS

| | | |
|---|---|---|
| 6,016,381 A | 1/2000 | Taira et al. |
| 6,078,727 A | 6/2000 | Saeki et al. |
| 6,532,334 B1 * | 3/2003 | Kikuchi et al. ............... 386/68 |
| 6,574,417 B1 * | 6/2003 | Lin et al. ...................... 386/70 |
| 6,708,334 B1 * | 3/2004 | deCarmo et al. ........... 718/106 |
| 6,757,480 B1 * | 6/2004 | Moon et al. .................. 386/69 |
| 6,789,072 B1 * | 9/2004 | Kim et al. ...................... 707/3 |
| 7,111,009 B1 * | 9/2006 | Gupta et al. ................ 707/102 |

FOREIGN PATENT DOCUMENTS

| | | |
|---|---|---|
| EP | 0786909 | 7/1997 |
| JP | 10-40667 | 2/1998 |
| JP | 2875233 | 1/1999 |
| JP | 11155130 | 6/1999 |
| JP | 11261964 | 9/1999 |

OTHER PUBLICATIONS

English Language Abstract of JP 11-261964.
English Language Abstract of JP 10-40667.

* cited by examiner

Fig.3

MANAGEMENT DATA FILE (MGR_DATA)

| FIELD NAME | CONTENT | SIZE (bit) |
|---|---|---|
| USHORT DataType | MGR_DATA TYPE (FIXED) | 16 |
| USHORT DataSize | MGR_DATA SIZE | 16 |
| USHORT Version | VERSION | 16 |
|  |  |  |
| OBJPOSITION ResumeMarker | PROGRAM ID + OFFSET (ms) | 32+32 |
| BYTE TextInfo [200] | TEXT INFORMATION | 200 Bytes |

PROGRAM MANAGER FILE (PRG_MGR)

| FIELD NAME | CONTENT | SIZE (bit) |
|---|---|---|
| USHORT DataType | PRG_MGR TYPE (FIXED) | 16 |
| USHORT DataSize | PRG_MGR SIZE | 16 |
| ULONG PlayBackDuration | PLAYBACK DURATION OF ALL PROGRAM (ms) | 32 |
| USHORT NumPrgInfo | NUMBER OF PROGRAM INFORMATION | 16 |
| PRG_INFO PrgInfoTbl [NumPrgInfo] | TABLE OF PROGRAM INFORMATION | Variable |

Fig.5

| PROGRAM INFORMATION (PRG_INFO) | | |
|---|---|---|
| FIELD NAME | CONTENT | SIZE (bit) |
| USHORT DataType | PRG_INFO TYPE (FIXED) | 16 |
| USHORT DataSize | PRG_INFO SIZE | 16 |
| OBJECTID PrgID | PROGRAM ID | 32 |
| ULONG PlaybackDuration | PLAYBACK DURATION (ms) | 32 |
| USHORT Attribute | ATTRIBUTE (USE PROTECT, SCENE DESCRIPTION ?) | 16 |
| USHORT Profile | PROFILE INFORMATION | 16 |
| BYTE TextInfo[200] | TEXT INFORMATION (TITLE) | 204 Byte |
| | | |
| ULONG RepPos | SPECIFY THE PLACE WHERE MAIN PICTURE EXIST | 64 |
| | | |
| USHORT NumRefMoi | NUMBER OF MEDIA OBJECT MANAGED BY THIS PROGRAM | 16 |
| ULONG RefMoiTbl[NumRefMoi] | OBJECT ID OF MEDIA OBJECT, PLAYBACK DURATION, TABLE SHOWING PRESENCE AND ABSENCE SUBORDINATION OBJECT | 64*NumObjIDTbl |
| | | 8 |
| | | |
| BYTE NumMarker | NUMBER OF MARKER INFORMATION | 8 |
| ULONG MarkerTbl[NumMarker] | MARKER INFORMATION (OFFSET VALUE ms) TABLE | 32*NumMarker |

51 — OBJECTID PrgID
52 — ULONG PlaybackDuration
53 — USHORT NumRefMoi
54 — ULONG RefMoiTbl

PRG_INFO2
PRG_INFO1

Fig.6

PLAY LIST MANAGER FILE (PLST_MGR)

| FIELD NAME | CONTENT | SIZE (bit) |
|---|---|---|
| USHORT DataType | PLST_MGR TYPE (FIXED) | 16 |
| USHORT DataSize | PLST_MGR SIZE | 16 |
| USHORT NumPlstInfo | NUMBER OF PLAYLIST INFORMATION | 16 |
| PLST_INFO PlstInfoTbl [NumPlstInfo] | TABLE OF PLAYLIST INFORMATION | Variable |

Fig.7

PLAYLIST INFORMATION (PLST_INFO)

| FIELD NAME | CONTENT | SIZE (bit) |
|---|---|---|
| USHORT DataType | PRG_INFO TYPE (FIXED) | 16 |
| USHORT DataSize | PRG_INFO SIZE | 16 |
|  |  |  |
| ULONG PlayBackDuration | PLAYBACK DURATION (ms) | 32 |
| ULONG Attribute | ATTRIBUTE (PROTECT) | 16 |
| BYTE TextInfo [200] | TEXT INFORMATION (TITLE) | 200 Byte |
| ULONG RepPos | SPECIFY THE PLACE WHERE MAIN PICTURE EXIST | 64 |
|  |  |  |
| USHORT NumPrgID | NUMBER OF PLAYBACK PROGRAM INFORMATION MANAGED BY THIS PLAYLIST | 16 |
| PLAYBACK PROGRAM INFORMATION — ULONG ObjID | OBJECT ID OF PROGRAM | 32 — X NumPrgID |
| PLAYBACK PROGRAM INFORMATION — ULONG StartPos | PLAYBACK START TIME (ms) | 32 |
| PLAYBACK PROGRAM INFORMATION — ULONG EndPos | PLAYBACK END TIME (ms) | 32 |
| BYTE NumMarker | NUMBER OF MARKER INFORMATION | 8 |
| ULONG MarkerTbl [NumMarker] | MARKER INFORMATION (OFFSET VALUE ms) TABLE | 32*NumMarker |

71 — PLAYBACK PROGRAM INFORMATION

Fig.8

MEDIA OBJECT INFORMATION FILE (*.MOI)

| FIELD NAME | CONTENT | SIZE (bit) |
|---|---|---|
| USHORT DataType | MOI TYPE (FIXED) | 16 |
| USHORT DataSize | MOI SIZE | 16 |
| Playback Duration | MOI PLAYBACK DURATION PTm | 4 |
| ATTRIBUTE TextAttr | TEXT CODE USED FOR TEXT DATA ETC. | 128 |
| BYTE TstType | TIME SEARCH TABLE TYPE (Tst Type=1,2,3) | 8 |
| TstType=1 USHORT TstInterval | RESOLVING POWER OF TIME SEARCH TABLE (ms) | 16 |
| USHORT FrameTime | REPRESENT 1 FRAME TIME WITH FRACTION (ms) | 32 |
| USHORT NumTstEntry | TIME SEARCH TABLE ENTRY NUMBER | 16 |
| UINT16 NumModui | MODU INFORMATION TABLE NUMBER | 16 |
| MODU INFO ModuiTbl [NumModui] | MODU INFORMATION TABLE | 48*NumModui |
| ENTRY UINT16 ModuNumber | MODU NUMBER | 16 / X NumTstEntry1 |
| ENTRY UINT8 EntryFrameDiff | FRAME NUMBER FROM ONE PREVIOUS ENTRY FRAME TO TIME SEARCH ENTRY | 8 |
| ENTRY UINT32 ModuOffset | MODU POSITION (byte) | 32 |
| TstType=2 USHORT TstInterval | RESOLVING POWER OF TIME SEARCH TABLE (ms) | 16 |
| USHORT NumTstEntry2 | TIME SEARCH TABLE ENTRY NUMBER | 16 |
| ENTRY UINT8 EntryFrameDiff | FRAME NUMBER FROM ONE PREVIOUS ENTRY FRAME TO TIME SEARCH ENTRY | 8 / X NumTstEntry2 |
| ENTRY UINT32 ModuOffset | MODU POSITION (byte) | 32 |
| TstType=3 UINT32 FrameTime | REPRESENT 1 FRAME PLAYBACK TIME WITH FRACTION (ms) | 32 |
| ULONG PacketSize | PACKET SIZE (BYTE) | 32 |
| BYTE NumFrame | FRAME NUMBER IN 1 PACKET | 8 |

Fig. 9

MEDIA OBJECT UNIT INFORMATION (MODU_INFO)

| FIELD NAME | CONTENT | SIZE (bit) |
|---|---|---|
| USHORT EntrySize | Entry Frame SIZE (Byte) | 20 |
| USHORT ModuPbTime | FRAME NUMBER CONSTRUCT MODU | 6 |
| USHORT ModuSize | MODU SIZE (byte) | 22 |

Fig.10

EXAMPLE OF RECORDING PROCESS
DETECT NEW RECORDING MEDIA
 CREATE SD-VIDEO DIRECTORY, MGP_INFO DIRECTORY, PRG_MGR FILE AND DETECT FORMATTING RECORD MODE ON
 CHECK PROGRAM NAMES IN Root DIRECTRY TO DETERMINE NEXT PROGRAM NUMBER nnn
 (TYPICALLY HIGHEST EXISTING PROGRAM NUMBER +1, IF ALREADY MAXIMUM THEN NEXT AVAILABLE NUMBER,
 IF NO NUMBER IS AVAILABLE THEN WARNING IS ISSUED.)
 CREATE PROGRAM DIRECTORY (PRGnnn)
ABOVE-PROCEDURE IS THEREAFTER REPEATED DETECT FIRST Rec OPERATION
 START RECORDING OF MEDIA OBJECT DATA FILE (MOV001.MOD)
 CREATE MEDIA OBJECT INFORMATION FILE (MOV001.MOI)

DETECT Stop OPERATION
 END MOD FILE RECORDING, UPDATE MEDIA OBJECT INFORMATION FILE (MOV001.MOI)
 (dataSize, NumModul, ModuiTbl, NumTstEntry1, TstEntry1)
 CREATE SCENE DESCRIPTOR DATA FILE (SCN001.SML)
 UPDATE PRG_INFO (DataSize, PlaybackDuration, NumReMoi, RefmoiTbl)

DETECT RECORDING MODE OFF
 UPDATE PROGRAM MANAGER (PRG_MGR) (DataSize, PlaybackDuration, NumPrgInfo)

Fig.12

EXAMPLE OF PLAYLIST PLAYBACK PROCESS
DETECT Play OPERATION (PLAYLIST INFORMATION n IS SPECIFIED)
  ACCORDING TO PLAYLIST INFORMATION n (PLST_INFO n) IN PLAYLIST MANAGER (PLST_MGR)

FROM BEGINNING, PLAYBACK START TIME StartPos IN FIRST SPECIFIED PROGRAM (PRGnnn)
IS SEQUENTIALLY COMPARED WITH MEDIA OBJECT PLAYBACK TIME MoiDuration IN
CORRESPONDING PROGRAM IN PRG MGR, THEN BELOW-PROCEDURE IS REPEATED
UNTIL StartPos<MoiDuration TO OBTAIN PLAYBACK MEDIA OBJECT INFORMATION
MOVmmm.MOI StartPos=StartPos−MoiDuration,
    EndPos=EndPos−MoiDuration, TO NEXT MEDIA OBJECT Entry Pointer register=0
THEREAFTER BELOW-PROCEDURE IS REPEATED UNTIL StartPos<TstInterval StartPos=StartPos−TstInterval, EndPos=EndPos−TstInterval,
  Entry Pointer register=Entry Pointer register+1

OBTAIN ENTRY POINT ModuOffset INDICATED BY Entry Pointer resister TO READ MEDIA
OBJECT DATA FROM THE POINT, COUNTING FRAME NUMBER, IF FRAME NUMBER TO BE SENT
TO DECODER IS EQUAL TO EntoryFrameDiff, WHEN TOTAL PLAYBACK TIME OF THE
FOLLOWING FRAME BECOME GREATER THAN StartPos, OUTPUT DECODER OUTPUT TO DISPLAY
IF SUBORDINATE MEDIA OBJECT IS SPECIFIED IN MEDIA OBJECT INFORMATION (MOVppp.MOI),
CORRESPONDING STREAM IS REPLACED WITH SUBORDINATE MEDIA OBJECT THEN REPRODUCE
IF SCENE DESCRIPTION DATA EXIST, AND IF STILL IMAGE (PICqqq.JPG), TEXT (TXTqqq.TXT), AND
MOD ARE ORDERED TO REPRODUCE AT THE SAME TIME, REPRODUCE THOSE THEREAFTER, BELOW-PROCEDURE IS REPEATED UNTIL EndPos<0, CONTINUING REPRODUCTION EndPos=EndPos−TstInterval,
  Entry Pointer register=Entry Pointer register+1

REPEAT ACCORDING TO NEXT SPECIFIED PROGRAM AND PLAYBACK START TIME

AUTOMATICALLY Stop

Fig. 13

EXAMPLE OF RANDOM PLAYBACK PROCEDURE
USER SPECIFY PROGRAM nnn AND START/END TIME ON TOC DISPLAY CREATED
FROM PROGRAM MANAGER (PRG_MGR)
  DETECT Play OPERATION CHECK MEDIA OBJECT INFORMATION (MOVmmm.MOI) IN SPECIFIED PROGRAM (PRGnnn) IN SEQUENCE FROM BEGINNING,
  AND SUBTRACTING PLAYBACK TIME (PlayDuration) FROM USER-SPECIFIED START TIME, DETECT MEDIA OBJECT NUMBER ppp
  INCLUDES START TIME.
  FROM MOI ENTRY POINT TIME RESOLVING ABILITY (Tstinterval), DETECT PLAYBACK START Packet POSITION AND Ipacket POSITION,
  AND THEN START REPRODUCTION AT THE MEDIA OBJECT DATA (MOVppp.MOD) SPECIFY POSITION
  IF SUBORDINATION MEDIA OBJECT INFORMATION IS SPECIFIED IN MEDIA OBJECT INFORMATION (MOVppp.MOI), CORRESPONDING
  STREAM IS REPLACED WITH SUBORDINATION AND THEN REPRODUCE
  IF SCENE DESCRIPTION DATA EXIST
  AND IF STILL IMAGE (PICqqq.JPG), TEXT (TXTqqq.TXT) AND MOD ARE ORDERED TO BE REPRODUCED AT THE SAME TIME,
  REPRODUCE THOSE

THE ABOVE-PROCEDURE IS THEREAFTER REPEATED

NEXT MEDIA OBJECT DATA (MOVpp.MOD) IS REPRODUCED TOO
  IF SUBORDINATION MEDIA OBJECT IS SPECIFIED IN MEDIA OBJECT INFORMATION (MOVppp.MOI), CORRESPONDING STREAM IS
  REPLACED WITH SUBORDINATION AND THEN REPRODUCE
  IF SCENE DESCRIPTION DATA EXIST
  AND IF STILL IMAGE (PICqqq.JPG), TEXT (TXTqqq.TXT) AND MOD ARE ORDERED TO BE REPRODUCED AT THE SAME TIME,
  REPRODUCE THOSE Stop AT MOD PLAYBACK POINT OF PROGRAM WHICH ACCORD WITH END TIME

Fig.14

EXAMPLE OF FAST FORWARD / FAST REVERSE PROCEDURE
DETECT FAST FORWARD / FAST REVERSE OPERATION
  READ PLAYBACK RESUME POSITION PROGRAM (PRGnnn) AND PLAYBACK RESUME TIME
  BY MANAGEMENT DATA (MGR_DATA) RESUME MARKER DETECT PLAYBACK START MEDIA OBJECT DATA (MOVppp.MOD) BY SUBTRACTING
  MEDIA OBJECT INFORMATION (MOVmmm.MOI) PLAYBACK TIME FROM RESUME
  MARKER PLAYBACK RESUME TIME IN SEQUENCE
    ABOVE-PROCEDURE IS THEREAFTER REPEATED > OBTAIN CLOSEST MODU NUMBER BY DIVIDING PLAYBACK RESUME TIME
> REMINDER BY THE MEDIA OBJECT DATA TIME SEARCH INTERVAL TstInterval
> TO DETECT THE POSITION ModuOffset AND ENTRY SIZE
>   REPRODUCE I PICTURE
>   IF SUBORDINATE MOD IS SPECIFIED, REPRODUCE IT AT THE SAME TIME
>   IF SCENE DESCRIPTION DATA EXIST, REPRODUCE MOD,
>     REPRODUCE MOD, STILL IMAGE AND TEXT AT THE SAME TIME
>
> ABOVE-PROCEDURE IS THEREAFTER REPEATED
>
>> OBTAIN NEXT, IF FORWARD / PREVIOUS, IF REVERSE MODU FROM TIME
>> SEARCH TABLE TO
>>   REPRODUCE I PICTURE
>>   IF SUBORDINATE MOD IS SPECIFIED, REPRODUCE IT AT THE SAME TIME
>>   IF SCENE DESCRIPTION DATA EXIST, REPRODUCE MOD,
>>     REPRODUCE MOD, STILL IMAGE AND TEXT AT THE SAME TIME
>
> REPEAT FROM BEGINNING OF NEXT MEDIA OBJECT / FROM ENDING OF
> PREVIOUS MEDIA OBJECT

REPEAT FROM BEGINNING OF NEXT PROGRAM / FROM ENDING OF PREVIOUS PROGRAM

DETECT FAST FORWARD / REVERSE OPERATION STOP, THEN RECORD PROGRAM NUMBER
AND PLAYBACK RESUME TIME AT THE POINT IN RESUME MARKER

TRICK PLAY METHOD FOR DIGITAL STORAGE MEDIUM

TECHNICAL FIELD

The present invention relates generally to a method for recording and reproducing digital multimedia content such as video and audio to flash memory or other digital storage medium, and relates more particularly to trick play methods including random access, fast forward, and fast rewind playback modes.

BACKGROUND ART

Trick playback modes are achieved with conventional digital storage media by dividing the content into sectors of a specific size and then using an address table containing sector addresses and index numbers, time codes, content titles, and content encoding unit information.

FIG. 22 describes how a trick playback mode is implemented with conventional digital storage media. FIG. 22 (a) shows the data recording structure, and (b) to (f) are various sector address lookup tables recorded with the data in order to achieve a trick playback mode. More specifically, tables (b) to (f) cross reference index numbers, time codes, content titles, sequence header numbers (indicating the start of each sequence, that is, the content encoding unit), and the first and last sector address of each I-picture (a picture encoding type). The content is data compressed in sequential units using MPEG-1 or other compression encoding technique, then segmented into sector units of a specific size for recording to optical disc. A unique sector address is assigned to each sector. The sectors are further divided into blocks. Each block starts with a header containing a synchronization signal, common sector address, unique block address, and a parity bit, the header is followed by the content data; and the block then ends with an ECC parity word for error correction.

Trick playback modes are achieved with multimedia content recorded in this manner as follows.

It should be noted that playback of compressed content cannot start from any desired location. More specifically, playback can only start from specific positions, that is, the sequence header. This means that in order to randomly access content when the user selects an access point such as the beginning of a song, the sector address at the start of the selected content is first determined from table (d) in FIG. 22. Playback then starts from the sector address found in table (e) for the sector containing the sequence header containing the address closest to the sector address found in table (d).

If playback positions are defined more precisely, the user can use the index numbers to specify where in a song (for example) to start playback. In this case the sector address corresponding to the specified index number is found from table (b) to start playback. If the user specifies the playback start position using a time code, the sector address closest to the specified time code is found from table (c), and playback starts from the sector address found in table (e) of the sector containing the sequence header with an address closest to the sector address found in table (c). Fast-forward and fast-reverse play modes are similarly achieved by sequentially finding the start and end sector addresses of the independently reproducible I-pictures from table (f) and then skipping from I-picture to I-picture to play only the I-pictures in the forward or reverse play direction. The methods described above are known, for example, from U.S. Pat. No. 6,002,834, Optical Disk Having Table Relating Sector Address and Time and Optical Disk Reproducing Apparatus.

As will be understood from the tables in FIG. 22, the index numbers, time codes, sequence headers, and I-pictures are managed using sequential numbers in the prior art method described above. This means that in order to start playback from 10 seconds into content B, for example, this relative time must be converted to a specific value in the continuous time code. Because the total playback time of content A is unknown, however, an accurate time code for starting playback from 10 seconds into content B cannot be determined.

A further problem arises from the indeterminate length of the I-pictures. More specifically, because the I-picture length is variable, it is not known how much data must be read in order to skip to the next I-picture in fast-forward and fast-reverse play modes.

DISCLOSURE OF INVENTION

The present invention is directed to solving the above problems by providing a trick playback method for digital storage media used for recording and reproducing multimedia content containing compressed digital audio and video data.

A trick play method according to a first aspect of the present invention achieves a random access play mode using a digital storage medium recording and reproducing multimedia content including compression coded digital audio and video data by recording a directory segmenting the content into program units, segmenting the content into a plurality of media object units, and recording each media object unit as a separate file. The digital storage medium also records a program manager file storing a table containing an identifier (ID) for each program of recorded content and information about the media objects in each program, a media object information file storing a table containing playback time information and entry points at a specific time interval for each media object, and a playlist manager file containing playlist information including a user-specified playback start program ID and the specified playback start time and end time of said program. Random access play mode when a user specifies a playback start program ID and playback start time within said program is achieved by reading the playback times in the media object information of the specified program sequentially from the beginning of the specified program to detect media object k at the user-specified playback start time. The entry point at the user-specified playback start time is then detected by subtracting the total playback time to the immediately preceding media object from the user-specified playback start time, and comparing the difference with a time search table resolution in the media object information for media object k. Data for media object k is then read and supplied to the decoder from the entry frame of the media object data unit containing the entry point. The decoder starts output to the display when decoding advances to the entry point; and thereafter media objects are sequentially decoded according to the playlist information and program manager file A trick play method according to second and third aspects of the present invention achieve fast-forward and fast-reverse play modes using a digital storage medium recording and reproducing multimedia content including compression coded digital audio and video data by recording a directory segmenting the content into program units, segmenting the content into a plurality of media object units, and recording each media object unit as a separate file. The digital storage medium also records a program manager file storing a table containing an identifier (ID) for each program of recorded content and information about the media objects in each program; a media object information file storing a table containing playback time information and entry points at a specific time interval for each media object; a playlist manager file containing playlist information including a user-specified playback start program ID and the specified playback start time and end time of said program; and a management data file containing a resume marker consisting of a program ID for a program where playback was last interrupted and playback interrupt time where playback was interrupted in the program. When the user selects fast-forward play or fast-reverse play, the media object information in the program specified by the resume marker is reads in sequence from the beginning, and the playback time in the media object information is sequentially compared with the interrupt time to detect media object k where the cumulative playback time first exceeds the interrupt time. The entry point number is then detected by calculating the difference of the interrupt time specified by the resume marker minus the total playback time to the immediately preceding media object, and dividing this difference by the time search table resolution in the media object information of media object k. Entry frame data for the media object data unit corresponding to said entry point is then read and supplied to the decoder These steps are then repeated to supply entry frame data for the next media object data unit to the decoder if fast-forward play is selected, or supply entry frame data for the preceding media object data unit to the decoder if fast-reverse play is selected. When fast-forward or fast-reverse play ends, the resume marker is rewritten with the program ID of the program at which playback is interrupted and the time in said program when playback was interrupted.

This file configuration and playback sequence enables random access playback from any user-selected point in the content, and enables fast-forward, fast-reverse, and other trick play modes by accurately reading only the data required for the selected trick play mode.

The digital storage media trick playback method according to the first and second aspects of this invention enables complicated trick playback modes requested by the user to be easily achieved.

More particularly, the method according to the first aspect of the invention easily starts random access playback from a desired position specified by the user.

The method of the second aspect of the invention efficiently achieves fast-forward and reverse play modes as specified by the user.

BRIEF DESCRIPTION OF DRAWINGS

FIG. 3 shows an example of the management data file MGR_DATA in a preferred embodiment of the invention;

FIG. 4 shows an example of the program manager file PRG_MGR in a preferred embodiment of the invention;

FIG. 5 shows an example of the program information PRG_INFO in the program manager file PRG_MGR;

FIG. 6 shows an example of the playlist manager file PLST_MGR in a preferred embodiment of the invention;

FIG. 7 shows an example of the playlist information PLST_INFO in the playlist manager file PLST_MGR;

FIG. 8 shows an example of a media object information file *.MOI in a preferred embodiment of the invention;

FIG. 9 shows an example of the media object unit information MODU_INFO in a media object information file;

FIG. 10 shows an example of the recording process in a preferred embodiment of the invention;

FIG. 12 shows an example of the playback process using a playlist in a preferred embodiment of the invention;

FIG. 13 shows an example of the random playback process in a preferred embodiment of the invention;

FIG. 14 shows an example of the fast-forward/fast-reverse playback process in a preferred embodiment of the invention;

BEST MODE FOR CARRYING OUT THE INVENTION

A digital storage media trick playback method according to a preferred embodiment of the present invention is described next with reference to the accompanying figures.

"Trick play" as used herein includes the following: reverse playback at normal speed; forward and reverse playback at fast-forward speed; forward and reverse playback at slow speed, random playback; jumping; and pause.

"Fast-forward" means playback in the normal forward direction at a speed faster than the normal playback speed.

"Fast-reverse" means playback in the reverse direction at a speed faster than the normal playback speed.

Digital storage media of the present invention include semiconductor memory cards such as flash memory, but do not include disk or tape media. Digital storage media of this invention are thus static recording media not having any moving parts, and do not include driven recording media (such as disks and tape) using moving parts.

Figure 1:
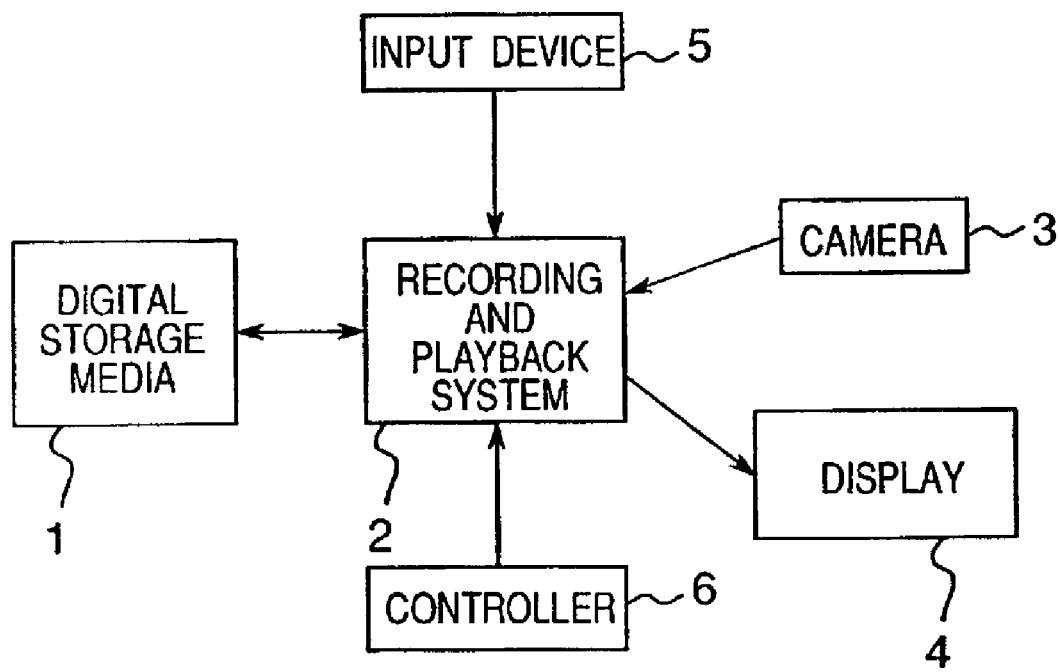
FIG. 1 is a block diagram of the configuration of a digital storage media recording and playback system according to a preferred embodiment of the invention.

FIG. 1 is a block diagram of a recording and playback system achieving various trick playback modes using a digital storage medium according to a preferred embodiment of this invention Shown in FIG. 1 are the digital storage medium 1, recording and playback system 2, a camera 3 for recording content, a display 4 for presenting content reproduced from the digital storage medium 1, an input device 5 such as a remote control device having a keypad, and a controller 6. Each of these components is connected to the recording and playback system 2. Content is captured by the camera 3, compressed by the recording and playback system 2 using the MPEG-1 or other standard, and recorded to the digital storage medium 1. The stored content is read from the digital storage medium 1, decompressed by the recording and playback system 2, and presented on the display 4.

These sequences of operations are executed according to commands from the input device 5 and controlled by the controller 6.

Figure 2:
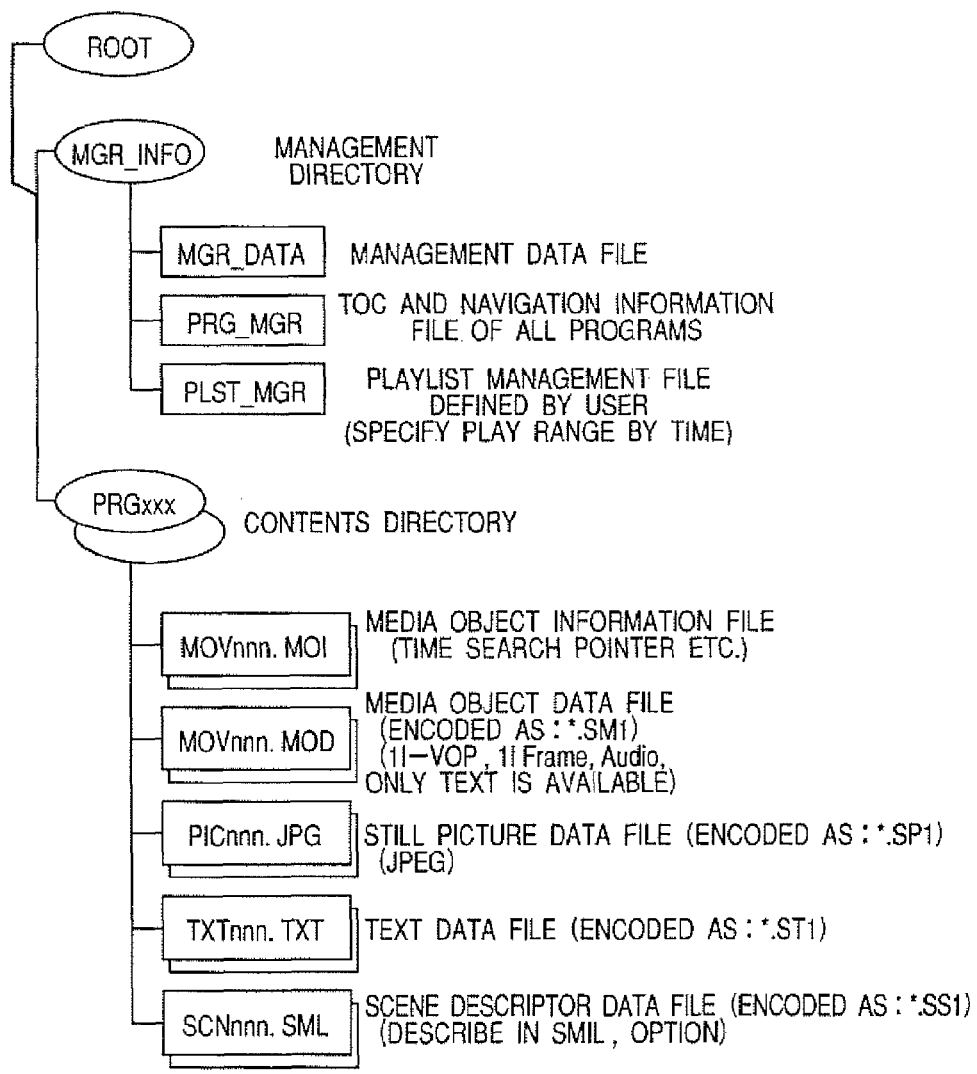
FIG. 2 shows the directory structure of a digital storage media according to a preferred embodiment of the invention.

FIG. 2 shows the directory structure of the content and management information files written to digital storage media in this embodiment of the invention.

To achieve the trick playback method of this invention, multimedia content containing video and audio data is recorded by program unit as a media object data file MOVnnn.MOD (where nnn is a hexadecimal value) in program directory PRGxxx (where xxx is a hexadecimal value), and information for the media object data entries is recorded to the media object information file MOVnnn.MOI. Still images and text data reproduced at the same time as the media object data are recorded to PCInnn.JPG and TXTnnn.TXT files, respectively. If plural video data objects are reproduced at the same time, which MOVnnn.MOD are reproduced is also written to the scene descriptor data file SCNnnn.SML.

Management information for the entire program is recorded in the management data file MGR_DATA, program manager file PRG_MGR and playlist manager file PLST_MGR in the management directory MGR_INFO.

FIG. 3 shows the structure of the management data file MGR_DATA. As shown in FIG. 3, the management data file MGR_DATA in this preferred embodiment of the invention contains the type DataType, size DataSize, and version Version of the management data, as well as a ResumeMarker recording where playback was stopped if playback is interrupted, and user-definable TextInfo.

FIG. 4 shows the structure of the program manager file PRG_MGR in this preferred embodiment of the invention. As shown in FIG. 4, the program manager file PRG_MGR contains the type DataType and size DataSize of the program manager, the total program playback time PlayBackDuration, the number of program information entries NumPrgInfo, and the program information PRG_INFO table (more specifically, an array of PrgInfoTbl[NumPrgInfo] entries).

FIG. 5 shows the structure of the program information PRG_INFO table in the program manager file PRG_MGR. As shown in FIG. 5 the program information PRG_INFO table contains the program information type DataType and size DataSize, the program identification number PrgID identifying the specific program (shown in field 51) and the playback time Playback Duration (shown in field 52). Also recorded are specific program Attributes declaring whether the content is protected and whether scene descriptors are used; profile information Profile indicating the encoding method used; user-definable text information TextInfo such as the program title or other information; an address RepPos of a scene or program part representative of the program content; the number of media objects NumRefMoi (shown in field 53) contained in the program; a reference table RefMoiTbl (the size of which is assigned by NumRefMoi) containing the object ID and playback of each media object and whether there are any associated objects; the number of user-definable markers NumMarker that the user can set in the program; and a marker location table MarkerTble (the size of which is determined by NumMarker).

FIG. 6 shows the structure of the playlist manager file PLST_MGR. As shown in FIG. 6 the playlist manager file PLST_MGR contains the file type DataType and size DataSize, the number of user-defined playlists NumPlstInfo, and a table PLST_INFO containing the playlists (specifically, PlstInfoTbl (the size of which is identified by NumPlstInfo)).

FIG. 7 shows the structure of the playlist information PLST_INFO in the playlist manager file PLST_MGR. As shown in FIG. 7 the playlist information PLST_INFO table contains the data type DataType and size DataSize, the list playback time Playback Duration, list attributes Attributes, text information TextInfo, the position of a representative picture RepPos, the number of programs specified in the playlist NumPrgID, playback program information (including the program object ID ObjID, playback start time StartPos, and playback end time EndPos) (shown in field 71), the number of markers NumMarker, and a marker location table MarkerTbl (an array of NumMarker values) identifying marker locations by time.

FIG. 8 shows the structure of the media object information file *.MOI in the program directory. As shown in FIG. 8 the media object information file *.MOI contains the file type DataType and size DataSize, the media object playback time PlayBackDuration, the character code and other attributes TxtAttr used in the text data, and a time search table type identifier TstType. Also included if the type identifier TstType value is 1 or 2 are the time search table resolution TstInterval, the time FrameTime defining the playback time of one frame expressed as a fraction, the number of entries NumTstEntry1 or NumTstEntry2 in the time search table, the number of information tables NumModui of compression-coded unit media object data units MODU that can be reproduced from that position, a media object data unit information table MODU_INFO (specifically, ModuiTbl (of size NumModui)), the media object data unit MODU number ModuNumber corresponding to each entry position, the number of frames EntryFrameDiff from the immediately preceding entry frame to the time search entry (that is, to the entry point), and the position (bytes) ModuOffset of the corresponding media object data unit. Included if the type identifier TstType value is 3 is the FrameTime defining the playback time of one frame expressed as a fraction, the size of one packet PacketSize, and the number of frames NumFrame in one packet.

FIG. 9 shows the structure of the media object unit information MODU_INFO in each media object information file *.MOI. As shown in FIG. 9 this information includes the size EntrySize of the entry frame (the first frame in a media object data unit), the number of frames ModuPbTime in the media object data unit, and the size ModuSize of the media object data unit.

Note that a media object data unit is also referred to below as simply MODU.

Figure 17:
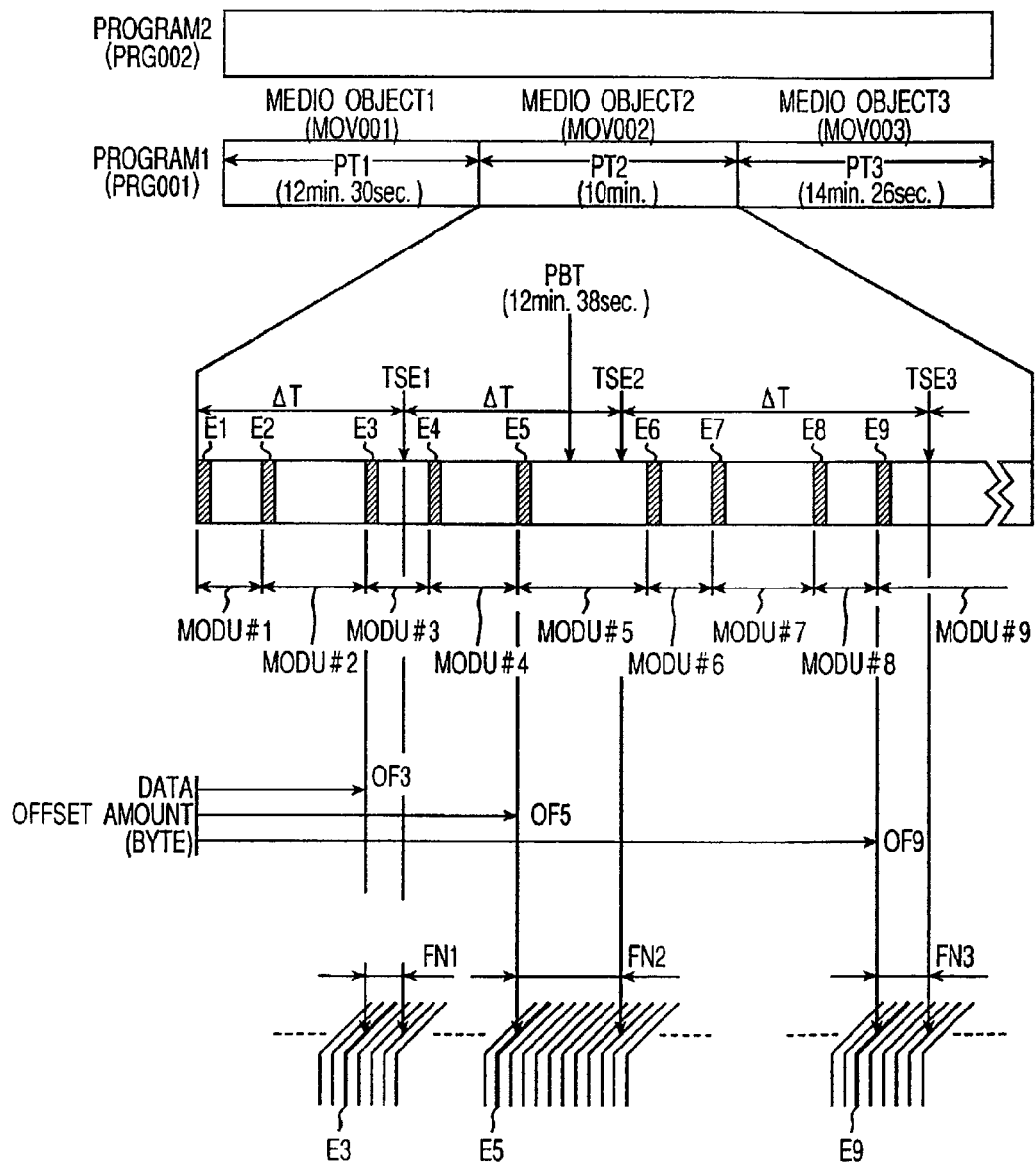
FIG. 17 shows the relationship between media object data units MODU and time search entries TSE.

Assume that plural programs, specifically two programs in this example, are recorded to the digital storage medium 1 as shown in FIG. 17. Assume further that one program (PRG001) records a children's field day at school, and the other program (PRG002) records a picnic. Management information relating to the field day program (PRG001) is recorded in program information PRG_INFO1 in FIG. 5, and management information for the picnic program (PRG002) is recorded in program information PRG_INFO2 in FIG. 5. PRG001 is recorded as the program ID to field 51, and the normal playback information for the entire program is recorded to the PlaybackDuration in field 52 in the field day program information PRG_INFO1. The same type of information is recorded to the corresponding fields in the picnic program information PRG_INFO2 table. Each program contains one or more media objects.

The field day program (PRG001) in this example contains three media objects as shown in FIG. 17. The first media object (MOV001) contains the opening ceremony for the field day, the second media object (MOV002) records the 100 meter dash, and the third media object (MOV003) records the closing ceremony. These three media objects can be created by the operating editing the content using the keypad on the input device 5, or they can be the originally recorded content. Field 53 in program information PRG_INFO1 (FIG. 5) stores the value "3" to indicate that program 1 contains three media objects.

Each media object contains a plurality of media object data units MODU. Each MODU normally starts with an I-frame as defined by the MPEG compression standard. More specifically, one media object data unit MODU extends from the beginning of the I-frame to the picture immediately before the start of the next I-frame FIG. 17 shows MODU #1 to MODU #9, each MODU starting with an I-frame. This first I-frame is called the "entry frame." In other words, the entry frame is the starting frame of the MODU, is a frame at which the decoder can start decoding, and is normally an I-frame but can be a P-frame. The frames following the entry frame are P-frames or B-frames. FIG. 17 also shows entry frames E1 to E9.

Time search entries TSE (that is, entry points) are also inserted at regular time intervals ΔT, every 5 seconds, for example, in the management information for each media object MOV as markers to make searching easier. This specific time interval ΔT determines the resolution of the time search table. More specifically, each time search entry TSE is defined by the time search table recorded to field 81 in FIG. 8. As shown in FIG. 8 the time search table contains information indicating the number of the MODU to which the time search entry is inserted, information indicating the number of frames from the time search entry to the immediately preceding entry frame, and the data offset indicating the amount of data from the start of the media object to the immediately preceding entry frame (that is, the number of bytes to that MODU).

The example shown in FIG. 17 contains time search entries TSE1, TSE2, and TSE3. The time search table defining time search entry TSE1 stores MODU #3 as the MODU number, FN1 (=3) as the information indicating the number of frames from the time search entry point to the immediately preceding (last) entry frame, and data offset OF3 as the amount of data from the beginning of the media object to the immediately preceding (last) entry frame.

The time search table defining time search entry TSE2 stores MODU #5 as the MODU number, FN2 (=8) as the information indicating the number of frames from the time search entry point to the immediately preceding entry frame, and data offset OF5 as the amount of data from the beginning of the media object to the immediately preceding entry frame.

The time search table defining time search entry TSE3 stores MODU #9 as the MODU number, FN3 (=4) as the information indicating the number of frames from the time search entry point to the immediately preceding entry frame, and data offset OF9 as the amount of data from the beginning of the media object to the immediately preceding entry frame.

It will thus be apparent that if there are plural time search entries, the same plural number of time search entry tables is recorded to field 81 in FIG. 8.

Random access play, fast-forward play, and fast-reverse play modes are executed as described below using a digital storage media configured as described above.

Figure 18:
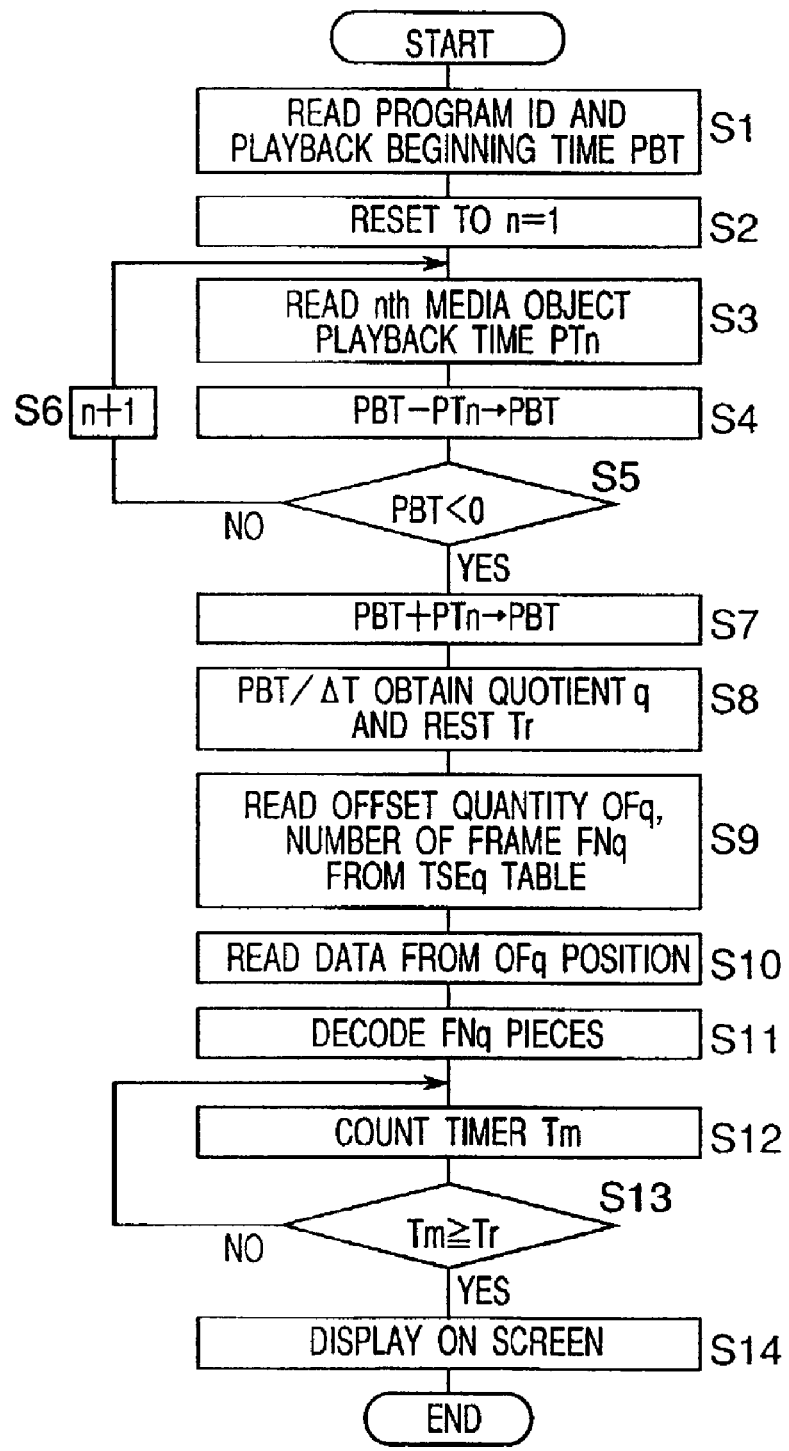
FIG. 18 Is a flow chart describing the operation for starting playback from a playback start time PBT.

Random access playback, that is, starting playback from some point between the beginning and end of a media object is described first. More specifically, this example describes playback from a playback start time PBT at 12 min 38 sec from the beginning of program 1 in FIG. 17 with reference to the flow chart in FIG. 18. The steps shown in FIG. 18 are executed by the controller 6.

The program ID (number) and playback start time PBT are read at step S1. If playback is to start from the time at which playback was interrupted, the program ID and offset time recorded as the resume marker in field 31 of FIG. 3 are read as the program number and playback start time PBT. To play back a specific user-edited period, the program object ID and playback start time stored to playlist information field 71 in FIG. 7 are read as the program number and playback start time PBT. Using the example shown in FIG. 17, program 1 and playback start time PBT=12 minutes 38 seconds are read.

The media object counter n is then reset to n=1 in step S2.

The playback time PTn for media object n is then read in step S3. This playback time PTn is stored to field 82 in FIG. 8. In the example shown in FIG. 17, the playback time of 12 minutes 30 seconds for the first media object 1 (MOV001) is thus read from field 82.

The playback time PTn is then subtracted from the playback start time PBT, and the difference is stored as the new playback start time PBT in step S4. Using the example shown in FIG. 17, the result is 12 m 38 s−12 m 30 s=8 s.

Step S5 then determines if the new playback start time PBT obtained as this difference is less than zero. If the sign is positive, the procedure advances to step S6.

The media object counter n is then incremented (step S6) so that n=2 in this case, and steps S3, S4 and S5 repeat.

This time step S4 calculates 8 s−10 m=−9 m 52 s and step S5 therefore detects that PBT is negative (less than zero). The procedure thus advances to step S7

Steps S3 to S6 thus detect the media object indicated by the playback start time by sequentially subtracting the playback time of each media object from the playback start time starting from the first media object, and comparing the resulting difference with the playback time of the next media object.

The last-subtracted playback time PTn is then added to the last difference in step S7 so that the playback start time PBT is a positive value. In this example the playback start time PBT is 8 seconds.

The final difference, that is, playback start time PBT, is then divided by the specific time interval ΔT, and the quotient q and remainder Tr are detected in step S8. As noted above, interval ΔT is 5 seconds in this example. Therefore, 8 s/5 s=1 remainder 3 s Using the previously calculated difference and the specific time interval ΔT, steps S7 and S8 thus detect time search entry TSEq closest to the playback start time PBT in the media object and the remaining time Tr from that time search entry to the playback start time.

The offset OFq and frame count FNq are then read from the time search table for the q-th time search entry TSEq (step S9). In this example offset OF3 and the frame count FN1 (=3) from the time search entry point to the immediately preceding entry frame are read from the time search table for time search entry TSE1.

The program is then accessed at offset OFq from the beginning of the program detected in step S1 (step S10). In this example the program is accessed at offset OF3 from the start of program 1.

The number of frames FNq determined in step S9 is then decoded and the program is accessed at time search entry TSEq (step S11). In this example three frames including entry frame E3 are decoded to access time search entry TSE1. Note that the frames are decoded at this time but are not presented on screen.

A timer is then started in step S12. Note that decoding continues while the timer runs but the frames are not displayed.

Whether the timer count Tm is greater than the remaining time Tr is then determined in step S13. Assume that the timer has counted to 3 seconds in this example.

The decoded content is then displayed on screen in step S14.

It is thus possible to begin playback on screen from a desired playback start time.

Note that step S8 above divides the playback start time PBT by the specific time interval ΔT to obtain the quotient q and remainder Tr. Alternatively, however, the interval ΔT can be subtracted from the playback start time PBT with the subtraction loop repeating until the difference is a positive value smaller than the interval ΔT. In this case the number of subtraction operations determines quotient q and the remainder is Tr.

Figure 19:
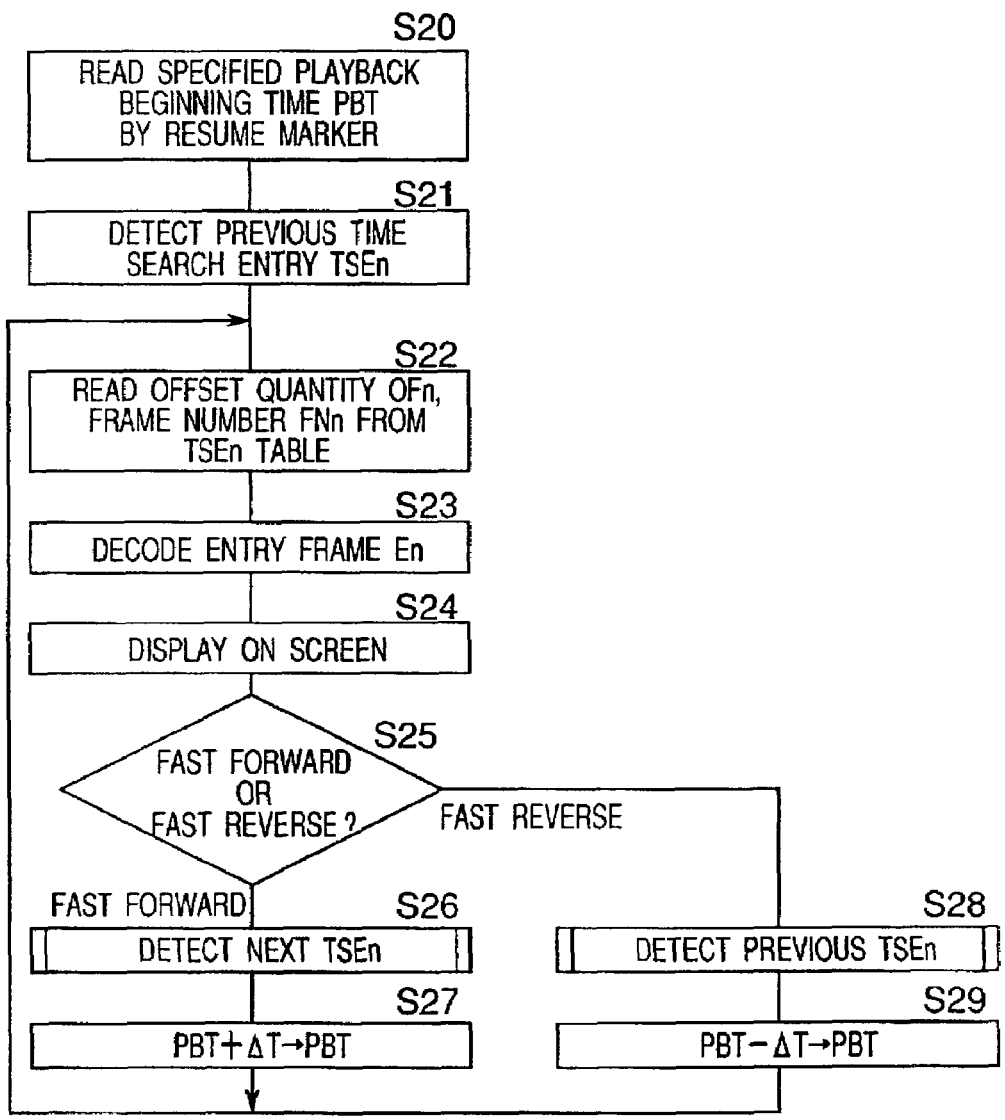
FIG. 19 is a flow chart describing the fast-forward and fast-reverse playback operations.
Figure 20:
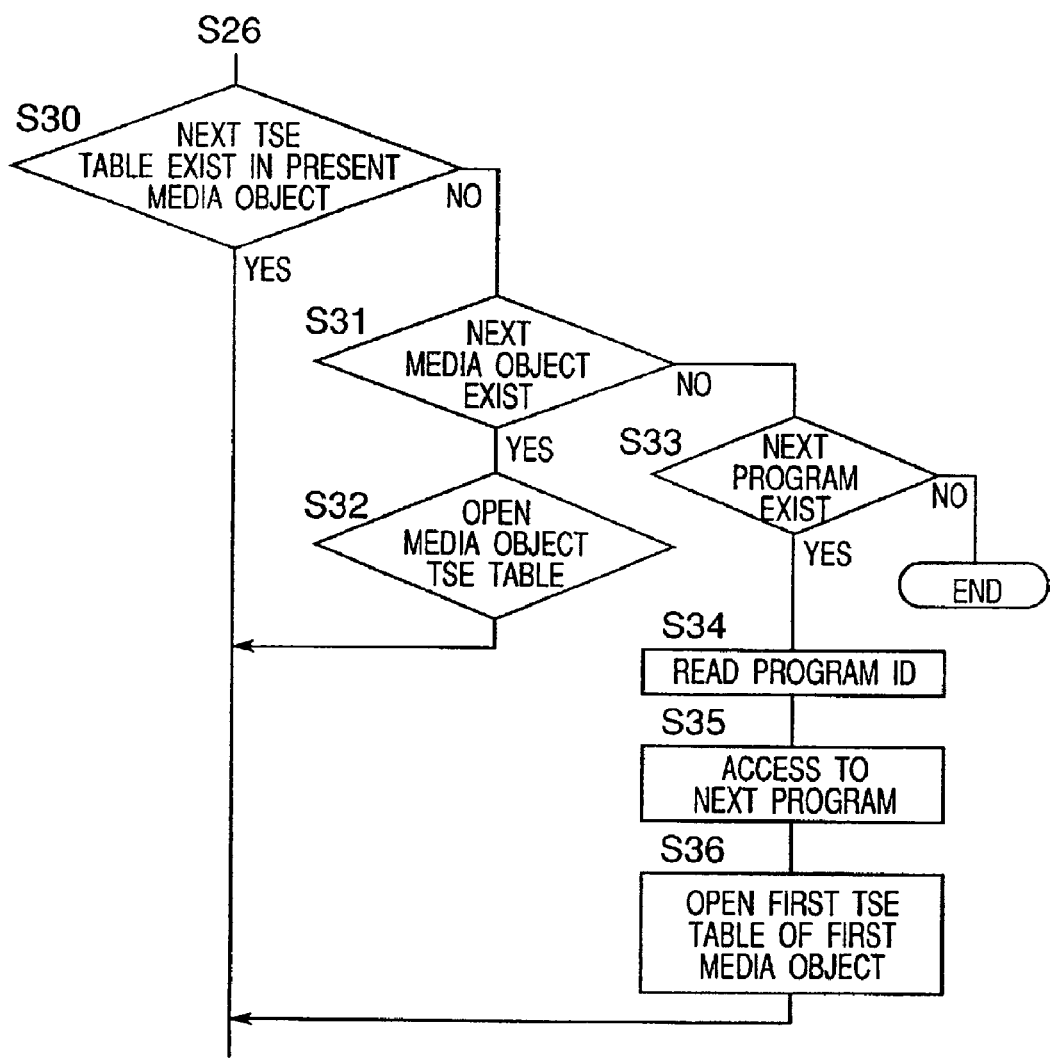
FIG. 20 is a flow chart for opening the time search table of time search entries TSE for fast-forward play.
Figure 21:
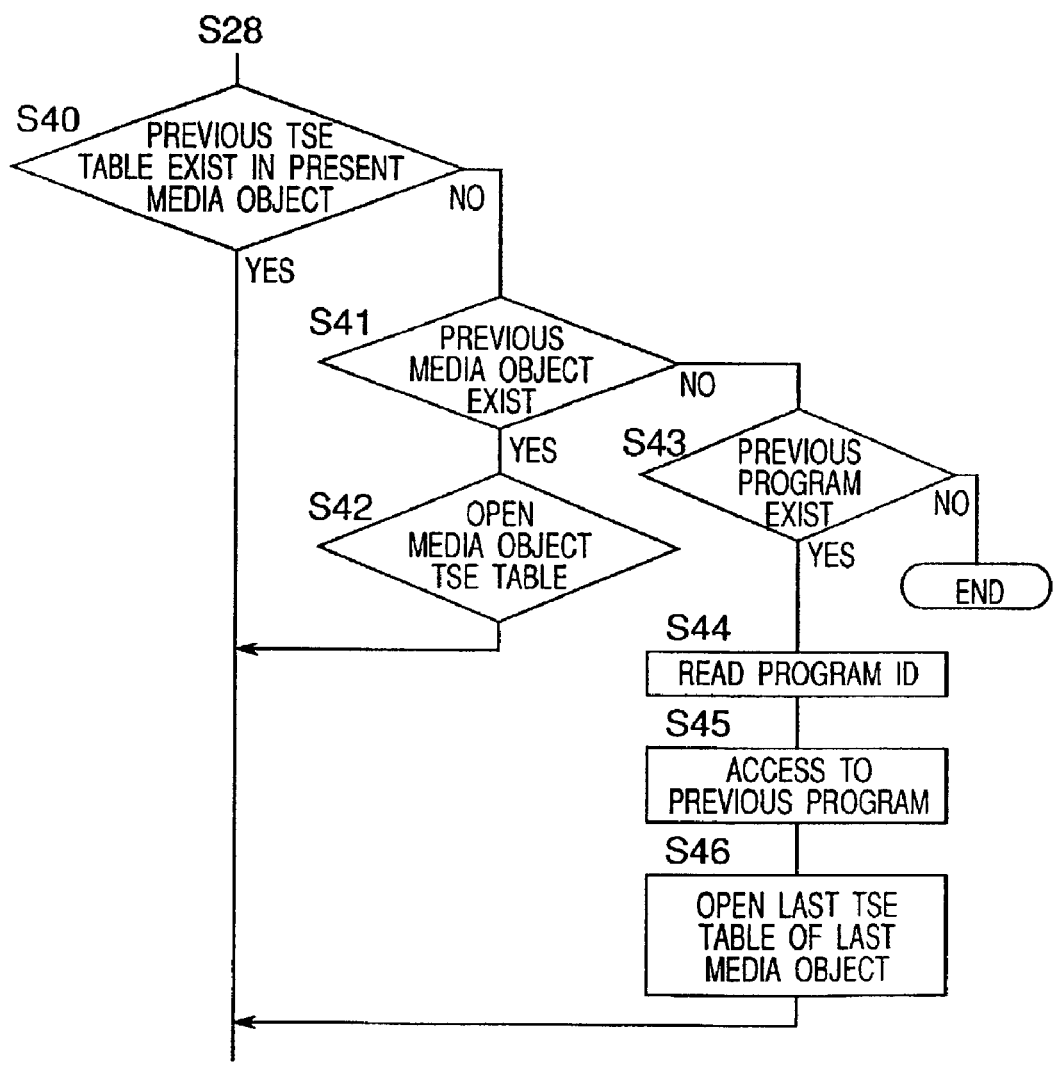
FIG. 21 is a flow chart for opening the time search table of time search entries TSE for fast-reverse play.
Figure 22:
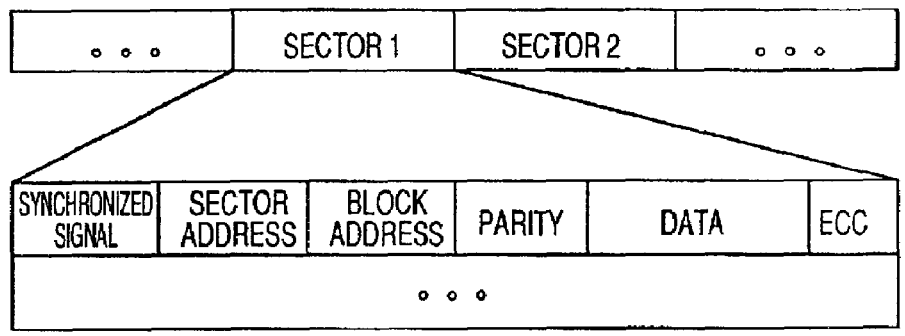
FIG. 22 shows the table structure used to achieve trick playback modes with a prior art digital storage media.

Fast-forward and fast-reverse playback modes are described next with reference to the flow charts in FIG. 19, FIG. 20, and FIG. 21. The steps shown in FIG. 19, FIG. 20, and FIG. 21 are executed by the controller 6.

First, the playback start time PBT specified by the resume marker is read in step S20.

The time search entry TSEn immediately before the playback start time PBT is then detected (step S21). These steps S20 and S21 accomplish the operations of steps S1 to S9 in FIG. 18.

Offset OFn is then read from the time search table for time search entry TSEn and time search entry TSEn is accessed (step S22).

Time search entry frame En is then decoded (step S23) and the decoded time search entry frame En is displayed (step S24).

Whether fast-forward play (high speed playback in the normal (forward) direction) or fast-reverse play (high speed playback in the reverse direction) has been selected is then determined (step S25). If fast-forward play was selected, the procedure advances to step S26; if fast-reverse, the procedure goes to step S28.

The next time search entry frame E(n+1) is detected in step S26, and the corresponding time search table is opened. This is described in detail with reference to FIG. 20.

The specific time interval ΔT is then added to playback start time PBT (step S27), and the procedure loops back to step S22.

If fast-reverse play was selected then the previous time search entry frame E(n−1) is detected in step S28, and the corresponding time search table is opened. This is described in detail with reference to FIG. 21.

The specific time interval ΔT is then subtracted from playback start time PBT (step S29), and the procedure loops back to step S22.

Step S26 in FIG. 19 is described in detail with reference to the flow chart in FIG. 20.

Decision diamond S30 determines if the management information for the currently accessed media object includes a table for identifying the next time search entry. If there is, the time search table for the next time search entry is opened. If not, control goes to step S31.

Step S31 determines if there is a next media object. If there is, the procedure advances to step S32; if not, control goes to step S33.

Step S32 then opens the time search table for the first time search entry TSE in the identified media object.

If there is not a next media object (step S31 returns no), step S33 determines if there is a next program. If there is not, the procedure ends. If there is, the procedure advances to step S34.

The next program ID is then read in step S34, and the identified next program is accessed (step S35).

Step S36 then opens the time search table for the first time search entry TSE of the first media object in the accessed program.

If the time search table for a next time search entry TSE is successfully opened in step S30, S32, or S36, the procedure advances to step S27 in FIG. 19, time interval ΔT is added to the playback start time PBT, the entry frame En closest before the detected time search entry TSE is decoded, and the entry frame is displayed as a result of steps S22, S23, and S24.

Step 28 in FIG. 19 for fast-reverse play is described next with reference to the flow chart in FIG. 21.

Decision diamond S40 determines if the management information for the currently accessed media object includes a table for identifying the preceding time search entry. If there is, the time search table for the preceding time search entry is opened. If not, control goes to step S41.

Step S41 determines if there is a previous media object. If there is, the procedure advances to step S42; if not, control goes to step S43.

Step S42 then opens the time search table for the last time search entry TSE in the identified media object.

Step S43 then determines if there is a preceding program. If not, the procedure ends. If there is, the procedure advances to step S44.

The preceding program ID is then read in step S44, and the identified preceding program is accessed (step S45).

Step S46 then opens the time search table for the last time search entry TSE of the last media object in the accessed program.

If the time search table for the preceding time search entry TSE is successfully opened in step S40, S42, or S46, the procedure advances to step S29 in FIG. 19, time interval ΔT is subtracted from the playback start time PBT, the entry frame En closest before the detected time search entry TSE is decoded, and the entry frame is displayed as a result of steps S22, S23, and S24.

These operations are further described below.

Multimedia content is recorded to this digital storage media according to the procedure shown in FIG. 10.

As shown in FIG. 10, when the recording and playback system 2 detects connection of a new digital storage medium 1, it creates a root directory, management directory MGR_INFO, and program manager file PRG_MGR in the digital storage medium 1, and initializes the DataType and other values.

When the recording and playback system 2 then detects that the user has selected the recording mode, it checks all program numbers in the root directory to determine the new (next) program number nnn, and creates a program directory PRGnnn. The next program number nnn is typically simply the highest existing program number +1, but if this number cannot be used then the next available program number is selected. If no program number is available, a warning is issued to the user.

When the recording and playback system 2 detects that the user has pressed the record button, it compresses the video content input from the camera 3 using the MPEG standard or other compression technique, records the compressed content as a media object data file MOV001.MOD in PRGnnn, and creates a media object information file MOV001.MOI.

When the user then stops recording, recording and playback system 2 stops recording media object data file MOV001.MOD, and writes the related information shown in FIG. 8 to the media object information file MOV001.MOI. A predetermined value is used for the time search table resolution TstInterval; MODU information MODU_INFO, entry count NumTstEntry 1 or 2, and the entry information (ModuNumber, EntryFrameDiff, ModuOffset) are determined with reference to the recorded MOV001.MOD file.

If the user has selected still images to be reproduced simultaneously with the recorded video, the time-base relationship for still image playback is recorded to the scene descriptor data file SCN001.SML.

Next, the data size DataSize, playback time PlaybackDuration, number of media object information entries NumRefMoi, and media object information table RefMoiTbl are updated in the corresponding program information PRG_INFO in the program manager file PRG_MGR.

The procedure described above is thereafter repeated while updating the media object data file number each time the user presses the record button.

When the recording mode turns off, the size DataSize, total playback time PlaybackDuration, and program count NumPrgInfo are updated for the program manager file PRG_MGR.

Figure 11:
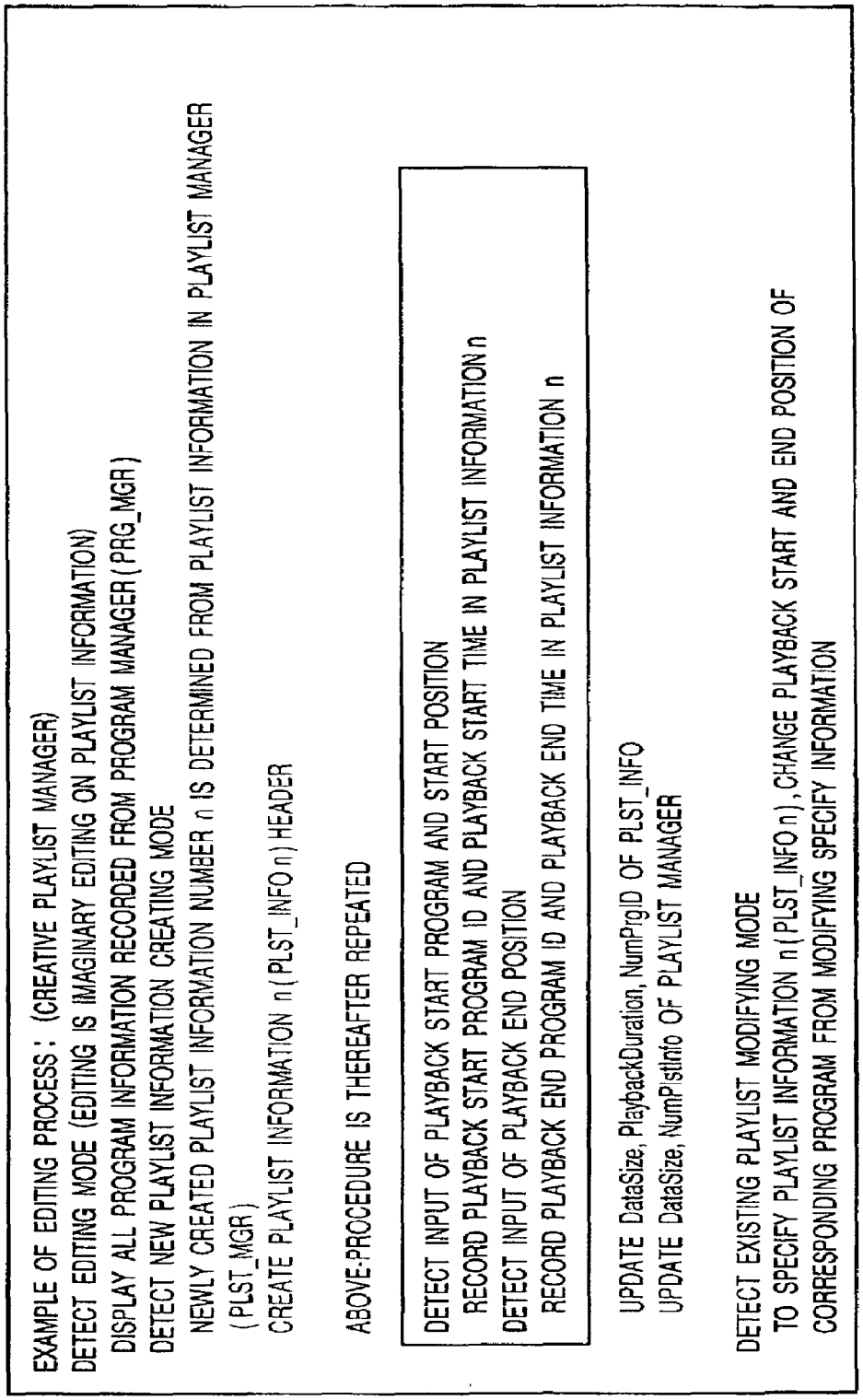
FIG. 11 shows an example of the editing process in a preferred embodiment of the invention.

Editing a recorded program is described next with reference to FIG. 11.

When the recording and playback system 2 detects that the user has selected an editing mode, it reads the program manager file PRG_MGR and the program information PRG_INFO therein to present a list of programs (including, for example, program titles, playback time, and representative images) recorded to the digital storage medium 1.

If the user then selects the create new playlist information mode, a new playlist information PLST_INFO table is added to the playlist manager file PLST_MGR, and the playlist information PLST_INFO header (including the type DataType and Attributes) is recorded as shown in FIG. 7.

Next, if the user specifies the program number to play back and the playback start and end positions by time, this information is recorded as the playback program information entries program identifier ObjID, playback start time StartPos, and playback end time EndPos in the playlist information PLST_INFO.

Playback program information for each subsequently selected program is similarly additionally recorded according to the playback start time and end time of the next user-selected program.

Finally, when the user instructs playlist registration, the remaining playlist header information (size DataSize, creation time CreateTime, playback time PlayBackDuration, number of program information entries NumPrgTbl) is updated, and the size DataSize and playlist count NumPlstInfo are updated in the playlist manager file PLST_MGR.

If the user selects the mode for modifying an existing playlist information PLST_INFO, the specified playlist information is displayed, and the program number, playback start time, and playback end time are modified according to the user instructions as described above.

If the user selects a mode for deleting part of the content and the deletion range covers an entire program, the entire directory for that program is erased, the corresponding program information in the program manager file PRG_MGR is erased, and the size DataSize, playback time PlaybackDuration, program count NumPrgInfo, and other information related to the deleted program is updated in the program manager file PRG_MGR.

Normal playback according to a playlist is described next with reference to FIG. 12.

When the user selects a particular playlist and then presses the play button, the recording and playback system 2 sequentially reads the playback program information in the specified playlist information PLST_INFO from the playlist manager file PLST_MGR. The recording and playback system 2 knows the playback program from the object identifier PrgID, sequentially reads the media object playback times from the media object table RefMoiTbl written in the corresponding program information PRG_INFO table of the program manager file PRG_MGR. The recording and playback system 2 subtracts each read media object playback time from the program playback start time StartPos, and detects the number ppp of the media object information MOVppp.MOI at which the resulting difference first turns negative.

Figure 15:
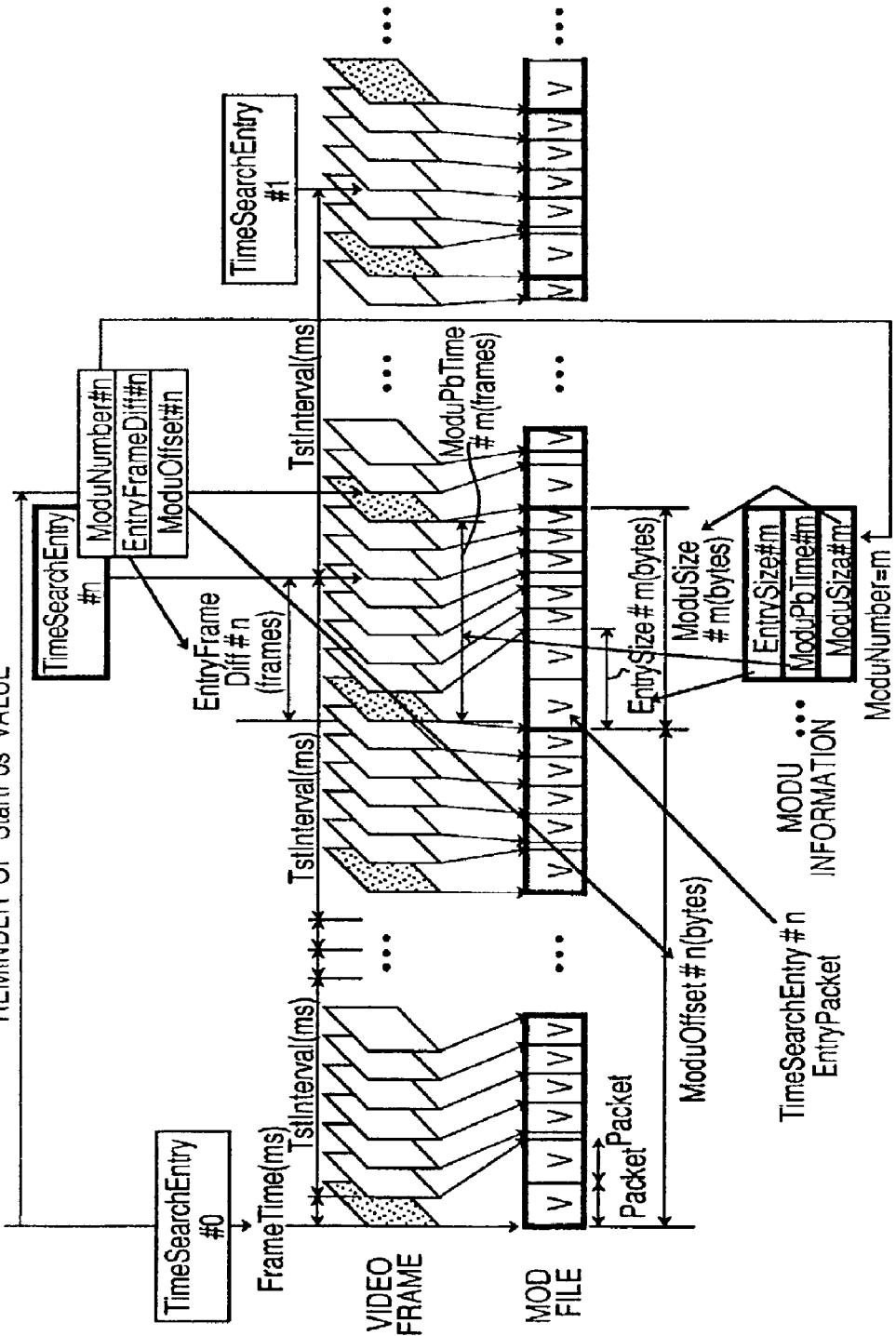
FIG. 15 illustrates the playback process.

Next, as shown in FIG. 15, the time resolution TstInterval value of the time search table in the media object information is repeatedly subtracted from the difference of the immediately preceding playback start time StartPos to sequentially skip intervening entry points. Media object data MOVppp.MOD is then sequentially read and supplied to the MPEG decoder from the media object data unit position indicated by ModuOffset #n of entry point #n where the sign of the playback start time StartPos difference first becomes negative. If the frame count read from the MODU entry frame is equal to EntryFrameDiff, the playback time of the following frames is recalculated, and supplying the reproduced content to the display 4 starts when the calculated playback time is greater than or equal to the playback start time StartPos difference.

If a SubObjID for an associated media object is specified in the media object information, that sub media object is reproduced instead of the audio packet in media object data MOVppp.MOD. If a scene descriptor data SCNnnn.SML is included, the still image PICppp.JPG or text data TXTpp.TXT specified therein is simultaneously reproduced as indicated.

Playback continues while subtracting the total playback time to the read media object data position from the playback end time EndPos in the playlist, and reading stops when the playback end time EndPos difference becomes negative.

The next program specified in the playlist information is reproduced next by repeating the above process.

When playback of all programs in the playlist is completed, reading the media object data stops, and playback according to the selected playlist ends.

A random access playback process is described next with reference to FIG. 13.

When the user selects a playback start program, playback start time, and end time, and then presses the play button, the recording and playback system 2 reads sequentially from the beginning of the media object ID table RefMoiTbl in the corresponding program information PRG_INFO table of the program manager file PRG_MGR, accumulates the playback times from media object information MOVnnn.MOI, and detects the first media object information MOVppp-.MOI entry beyond the playback start time specified by the user.

Next, the time search table resolution TstInterval of the current media object information MOVppp.MOI is repeatedly subtracted from the difference of the user-specified playback start time minus the total playback time accumulated from the skipped media object information entries to sequentially skip intervening entry points and find the entry frame where the difference from the user-specified playback start time first becomes negative. Media object data MOVpp.MOD is then read sequentially from the ModuOffset position of the MODU corresponding to the detected entry point and supplied to the MPEG decoder. As with playing a playlist as described above, output of the reproduced content starts when the total time of the frames read from the entry frame of that MODU is greater than the difference to the user-specified playback start time.

If a SubObjID for an associated media object is specified in the media object information, that sub media object is reproduced instead of the audio packet in media object data MOVppp.MOD. If a scene descriptor data SCNnnn.SML is included, the still image PICppp.JPG or text data TXTpp.TXT specified therein is simultaneously reproduced as indicated.

Playback stops when the total playback time goes beyond the playback end time specified by the user.

Fast-forward play and fast-reverse play are described next with reference to FIG. 14.

When the user presses the fast-forward or fast-reverse play button, the recording and playback system 2 reads the program number specified by the ResumeMarker in the management data file MGR_DATA. Note that the ResumeMarker shown in FIG. 3 stores the time at which playback is interrupted. More specifically, the ResumeMarker stores which program was being played when playback was interrupted, and how much time had elapsed from the beginning of that program when playback was interrupted. The media object playback time written to field 54 of the media object information table RefMoiTbl, which is written in the corresponding program information PRG_INFO (FIG. 5) in the program manager file PRG_MGR (FIG. 4), is subtracted from the resume playback time of the ResumeMarker to detect the media object information MOVppp.MOI at which the sign of the resume playback time of the ResumeMarker first becomes negative.

Figure 16:
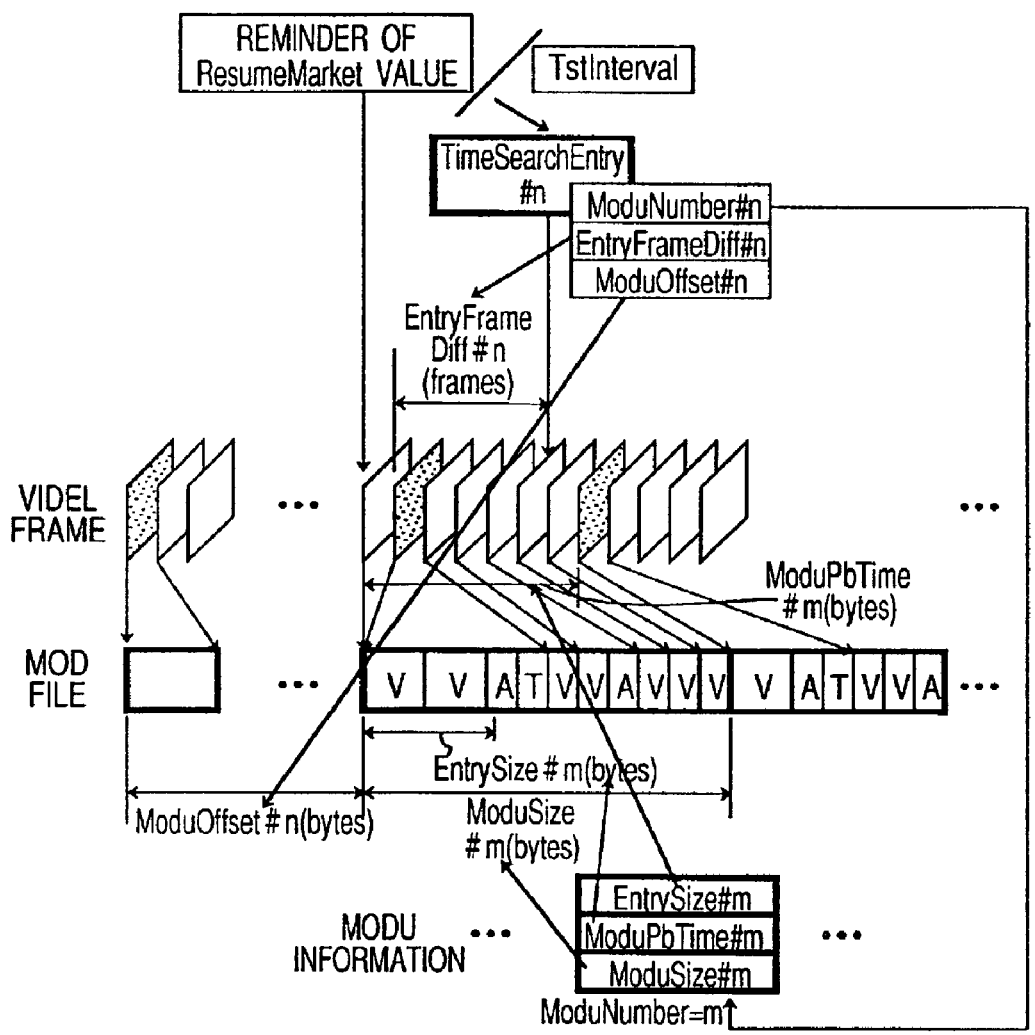
FIG. 16 illustrates the fast-forward/fast-reverse playback process.

Next, as shown in FIG. 16, the last difference of the ResumeMarker resume playback time is then divided by the time resolution TstInterval of the time search table in the current media object information MOVppp.MOI to detect the time search entry number #n Media object data MOVpp.MOD is then read from the ModuOffset position of the MODU at entry #n, supplied to the MPEG decoder, and output of the reproduced content starts. The #n-th media object unit information MODU_INFO is then read from the MODU information table ModuiTbl, reading shifts to the beginning of the next MODU entry frame when the number of bytes indicated by entry frame size EntrySize has been read, the amount of media object data MOVppp.MOD indicated by entry frame size EntrySize is read and supplied to the MPEG decoder, reading then skips to the next MODU, and this process simply repeats to continue fast-forward play until the end of the fast-forward play sequence is output.

The same basic operation is used when the user selects fast-reverse play except that after reproducing the first entry frame, reading skips to the preceding MODU to similarly play back the entry frame. This operation similarly repeats to the end of the fast-reverse sequence.

When the user releases the fast-forward or fast-reverse button, the program ID and playback position are recorded to the ResumeMarker, and the fast-forward or fast-reverse play operation ends.

As a result of the method described above, the playback method of the present invention can easily access a user-specified playback position. When the user selects a fast-forward, reverse play, or other trick play mode, the playback method of the invention can also easily read only the required data, and efficient trick play modes can be achieved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A trick play method for achieving a trick play mode with a digital storage medium used to record and reproduce multimedia content including compression coded digital audio and video data, the digital storage medium comprising
   a directory segmenting the content into programs, further segmenting the content into a plurality of media objects, and recording each media object as a separate file,
   a program manager file storing a table including an identifier (ID) for each program of recorded content and information about the media objects in each program,
   a media object information file storing a table including playback time information and entry points at a specific time interval for each media object,
   a playlist manager file comprising playlist information including a user-specified playback start program ID and a specified playback start time and end time of a program,
   a management data file including a resume marker comprising a program ID for a program where playback was last interrupted and playback interrupt time where playback was interrupted in the program,
   the trick play method achieving a fast-forward play mode when the user selects fast-forward play, the trick play method comprising:
      reading a media object information in a program specified by a resume marker in sequence from the beginning;
      sequentially comparing a playback time in the media object information with an interrupt time to detect media object k where a cumulative playback time first exceeds the interrupt time;
      detecting an entry point identified by a number determined by calculating the difference of the interrupt time specified by the resume marker minus a total playback time to an immediately preceding media object, and dividing this difference by a time search table resolution in the media object information of media object k;
      reading and supplying, to a decoder, entry frame data for a media object data corresponding to said entry point;
      repeating the above steps to supply entry frame data for a next media object data to the decoder; and rewriting the resume marker when fast-forward play ends with the program ID of the program at which playback is interrupted and the interrupt time in said program.

2. A trick play method for achieving a trick play mode with a digital storage medium used to record and reproduce multimedia content including compression coded digital audio and video data, the digital storage medium comprising
- a directory segmenting the content into programs, further segmenting the content into a plurality of media objects, and recording each media object as a separate file,
- a program manager file storing a table including an identifier (ID) for each program of recorded content and information about the media objects in each program,
- a media object information file storing a table including playback time information and entry points at a specific time interval for each media object,
- a playlist manager file comprising playlist information including a user-specified playback start program ID and a specified playback start time and end time of a program,
- a management data file including a resume marker comprising a program ID for a program where playback was last interrupted and playback interrupt time where playback was interrupted in the program, the trick play method achieving a fast-reverse play mode when the user selects fast-reverse play, the trick play method comprising:
- reading a media object information in a program specified by a resume marker in sequence from the beginning;
- sequentially comparing a playback time in the media object information with an interrupt time to detect media object k where a cumulative playback time first exceeds the interrupt time;
- detecting an entry point identified by a number determined by calculating the difference of the interrupt time specified by the resume marker minus a total playback time to an immediately preceding media object, and dividing this difference by a time search table resolution in the media object information of media object k;
- reading and supplying to a decoder entry frame data for a media object data corresponding to said entry point;
- thereafter repeating the above steps to supply entry frame data for a preceding media object data to the decoder; and
- rewriting the resume marker when fast-forward play ends with the program ID of the program at which playback is interrupted and the interrupt time in said program.

3. A playback method for reproducing multimedia content from a digital storage medium starting from a playback start time, the digital storage medium recording multimedia content comprising compression coded digital video data segmented into programs, each program segmented into media objects, and each media object segmented into media object data of which the first frame is a reproducible entry frame; and
- recording management information including a time search table defining a time search entry at each specific time interval from a beginning of each media object, a playback time for each media object, and a playback start time for a specified program,
- the time search table including an offset indicating a data length from a beginning of the specified program to a beginning of a media object data including the time search entry, and a frame count indicating a number of frames from the beginning of the media object data to the time search entry;
- the playback method reproducing content from the playback start time in a playback mode, the playback method comprising:
  - detecting a media object at a playback start time by sequentially subtracting a playback time of each media object from a playback start time starting from a first media object, and comparing a resulting difference with a playback of a next media object;
  - detecting a time search entry closest before the playback start time and a remaining time from said time search entry to the playback start time using said resulting difference and a specific time interval;
  - accessing a data offset in a specified program based on a time search table of the detected time search entry;
  - decoding a number of counted frames from an accessed point based on the time search table of the detected time search entry;
  - continuing decoding for a remaining time; and
  - displaying the decoded result after the remaining time passes.

4. A playback method according to claim 3, wherein the playback start time is a playback start time edited and specified by a user.

5. A playback method according to claim 3, wherein the playback start time is a playback start time specified by a resume marker containing time information indicating where playback was interrupted.

6. A playback method for reproducing multimedia content from a digital storage medium starting from a playback start time, the digital storage medium recording multimedia content comprising compression coded digital video data segmented into programs, each program segmented into media objects, and each media object segmented into media object data of which the first frame is a reproducible entry frame; and
- recording management information including a time search table defining a time search entry at each specific time interval from a beginning of each media object, a playback time for each media object, and a playback start time in a specified program,
- the time search table including an offset indicating a data length from a beginning of the specified program to a beginning of a media object data including the time search entry, and a frame count indicating a number of frames from the beginning of the media object data to the time search entry;
- the playback method reproducing content from near the playback start time in a fast-forward play mode, the playback method comprising:
  - detecting a media object at a playback start time by sequentially subtracting a playback time of each media object from a playback start time starting from a first media object, and comparing a resulting difference with a playback of a next media object;
  - detecting a time search entry closest before the playback start time using said resulting difference and a specific time interval;
  - accessing a data offset position in a specified program based on a time search table of the detected time search entry;

decoding an entry frame at which playback can start at the accessed data offset position and displaying a decoded content;

detecting a next time search entry;

accessing a next data offset position in the specified program based on the time search table of the detected next time search entry; and decoding a next entry frame at which playback can start at the next accessed data offset position and displaying the decoded content.

7. A playback method for reproducing multimedia content from a digital storage medium starting from a playback start time, the digital storage medium recording multimedia content comprising compression coded digital video data segmented into programs, each program segmented into media objects, and each media object segmented into media object data of which the first frame is a reproducible entry frame; and recording management information including a time search table defining a time search entry at each specific time interval from a beginning of each media object, a playback time for each media object, and a playback start time in a specified program, the time search table including an offset indicating a data length from a beginning of the specified program to a beginning of a media object data including the time search entry, and a frame count indicating a number of frames from the beginning of the media object data to the time search entry;

the playback method reproducing content from near the playback start time in a fast-reverse play mode, the playback method comprising:

detecting a media object at a playback start time by sequentially subtracting a playback time of each media object from a playback start time starting from a first media object, and comparing a resulting difference with a playback of a next media object;

detecting a time search entry closest before the playback start time using said resulting difference and a specific time interval;

accessing a data offset position in a specified program based on a time search table of the detected time search entry;

decoding an entry frame at which playback can start at the accessed data offset position and displaying a decoded content;

detecting a previous time search entry;

accessing a next data offset position in the specified program based on the time search table of the detected time search entry; and decoding an entry frame at which playback can start at the next accessed data offset position and displaying the decoded content.

8. A playback apparatus for reproducing multimedia content from a digital storage medium starting from a playback start time, the digital storage medium recording multimedia content comprising compression coded digital video data segmented into programs, each program segmented into media objects, and each media object segmented into media object data of which the first frame is a reproducible entry frame; and recording management information including a time search table defining a time search entry at each specific time interval from a beginning of each media object, a playback time for each media object, and a playback start time for a specified program, the time search table including an offset indicating a data length from a beginning of the specified program to a beginning of a media object data including the time search entry, and a frame count indicating a number of frames from the beginning of the media object data to the time search entry;

the playback apparatus comprising:

a media object detector configured to detect a media object at a playback start time by sequentially subtracting a playback time of each media object from a playback start time starting from a first media object, and comparing a resulting difference with a playback of a next media object;

a time search entry detector configured to detect a time search entry closest before a playback start time and a remaining time from said time search entry to the playback start time using said resulting difference and a specific time interval;

an accessor configured to access a data offset in a specified program based on a time search table of the detected time search entry;

a frame count decoder configured to decode the frame count number of frames from an accessed point based on the time search table of the detected time search entry; and a display configured to display a decoded result after the remaining time passes.

9. A playback apparatus according to claim 8, wherein the playback start time is a playback start time edited and specified by a user.

10. A playback apparatus according to claim 8, wherein the playback start time is a playback start time specified by a resume marker containing time in formation indicating where playback was interrupted.

11. A playback apparatus for reproducing multimedia content from a digital storage medium in a fast-forward play mode starting from a playback start time, the digital storage medium recording multimedia content comprising compression coded digital video data segmented into programs, each program segmented into media objects, and each media object segmented into media object data of which the first frame is a reproducible entry frame; and recording management information including a time search table defining a time search entry at each specific time interval from a beginning of each media object, a playback time for each media object, and a playback start time in a specified program, the time search table including an offset indicating a data length from a beginning of the specified program to a beginning of a media object data comprising the time search entry, and a frame count indicating a number of frames from the beginning of the media object data to the time search entry;

the playback apparatus comprising:

a media object detector configured to detect a media object at a playback start time by sequentially subtracting a playback time of each media object from the playback start time starting from a first media object, and comparing a resulting difference with a playback of a next media object;

a time search entry detector configured to detect a time search entry closest before the playback start time using said resulting difference and a specific time interval;

an accessor configured to access data offset position in the specified program based on a time search table of the detected time search entry;
an entry frame decoder configured to decode an entry frame at which playback can stan at the accessed data offset position and displaying a decoded content; and
a next time search entry detector configured to detect a next time search entry.

12. A playback apparatus for reproducing multimedia content from a digital storage medium in a fast-reverse play mode starting from a playback start time, the digital storage medium recording multimedia content comprising compression coded digital video data segmented into programs, each program segmented into media objects, and each media object segmented into media object data of which the first frame is a reproducible entry frame; and
recording management information including a time search table defining a time search entry at each specific time interval from a beginning of each media object, a playback time for each media object, and a playback start time in a specified program,
the time search table including an offset indicating a data length from a beginning of the specified program to a beginning of a media object data comprising the time search entry, and a frame count indicating a number of frames from the beginning of the media object data to the time search entry;
the playback apparatus comprising:
a media object at detector configured to detect a media object at a playback start time by sequentially subtracting a playback time of each media object from a playback start time starting from a first media object, and comparing a resulting difference with a playback of a the next media object;
a time search entry detector configured to detect a time search entry closest before the playback start time using said resulting difference and a specific time interval;
an accessor configured to access a data offset position in the specified program based on a time search table of the detected time search entry;
an entry frame decoder configured to decode an entry frame at which playback can start at the accessed data offset position and displaying a decoded content; and
a previous time search entry detector configured to detect a previous time search entry.

* * * * *